US010531272B2

(12) United States Patent
Saxena et al.

(10) Patent No.: US 10,531,272 B2
(45) Date of Patent: Jan. 7, 2020

(54) PLMN SPECIFIC SUPPLEMENTARY SERVICES CONSISTENCY IN HOME AND VISITED NETWORK

(71) Applicant: Hewlett Packard Enterprise Development LP, Houston, TX (US)

(72) Inventors: Ravi Saxena, Bangalore (IN); Srinivas Rangaraju, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/963,923

(22) Filed: Apr. 26, 2018

(65) Prior Publication Data
US 2019/0335313 A1  Oct. 31, 2019

(51) Int. Cl.
*H04W 8/06* (2009.01)
*H04W 8/20* (2009.01)
*H04W 8/12* (2009.01)
*H04W 84/04* (2009.01)

(52) U.S. Cl.
CPC ............ *H04W 8/06* (2013.01); *H04W 8/12* (2013.01); *H04W 8/20* (2013.01); *H04W 84/042* (2013.01)

(58) Field of Classification Search
CPC .......... H04W 8/06; H04W 8/205; G06F 3/048
See application file for complete search history.

(56) References Cited

U.S. PATENT DOCUMENTS

| 5,428,665 | A | 6/1995 | Lantto |
| 6,345,184 | B1 | 2/2002 | Van der Salm et al. |
| 6,529,732 | B1 | 3/2003 | Vainiomaki et al. |
| 6,643,511 | B1 * | 11/2003 | Rune ........................ H04Q 7/20 |
| 7,231,431 | B2 | 6/2007 | Sofer et al. |
| 8,644,476 | B2 | 2/2014 | Maas |
| 2008/0178005 | A1 * | 7/2008 | Gentry .................... G06F 3/048 |
| 2015/0050937 | A1 * | 2/2015 | Rosar .................... H04W 8/082 |
| 2016/0219428 | A1 * | 7/2016 | Noldus ................. H04W 8/205 |

OTHER PUBLICATIONS

European Telecommunications Standards Institute, "Digital Cellular Telecommunications System," Dec. 1995, pp. 1-20, GSM 03.15, Version 5.0.0.

* cited by examiner

*Primary Examiner* — Myron Wyche
(74) *Attorney, Agent, or Firm* — Sheppard Mullin Richter & Hampton LLP

(57) ABSTRACT

A mechanism for consistent public land mobile network (PLMN) specific supplementary services across different PLMNs or different service areas/regions of a PLMN is provided. A visited PLMN in which a subscriber unit is receiving or is attempting to receive service may be identified. Home PLMN specific supplementary services provisioned for the subscriber unit may be mapped to visited PLMN specific supplementary service codes set forth in the visited PLMN. These visited PLMN specific supplementary service codes may be used to replace the home PLMN specific supplementary service codes and transmitted to the visited PLMN using outgoing Mobile Application Part messages.

20 Claims, 9 Drawing Sheets

PLMN SPECIFIC SUPPLEMENTARY SERVICES CONSISTENCY IN HOME AND VISITED NETWORK

DESCRIPTION OF THE RELATED ART

Mobile telephony has become a ubiquitous form of communication, Devices such as mobile phones/smartphones enable users to communicate without being tethered to telephony landlines. In addition to telecommunications, some devices allow users to exchange data, capture or create media, as well as perform operations previously relegated to full-service computing equipment. In some cases, users have eschewed telephony landlines altogether due to continually expanding network coverage that allow users to make and receive calls from nearly anywhere they desire.

Generally, telecommunications networks, such as public switched telephone networks (PSTN) and public land mobile networks (PLMNs) utilize Signaling System No. 7 (SS7) signaling to control network services and capabilities, including services and capabilities on fixed communications networks and mobile communications networks. Mobile communications networks may include cellular communications networks based on a variety of protocols such as the Global System for Mobile Communications (GSM), Time Division Multiple Access (TDMA), or Code Division Multiple Access (CDMA). Home Location Registers (HLRs) are used by mobile communications network operators to maintain a database of subscriber units for their Mobile Switching Centers (MSCs) and the geographic coverage areas those MSCs service. A Visitor Location Register (VLR), on the other hand, maintains, for a particular MSC, a database of subscriber units roaming within that particular MSC's geographic coverage area. During mobile network operations, SS7 signals can be communicated between HLRs, VLRs and other network entities over network links and through Signal Transfer Points (STPs), which are responsible for routing SS7 signals within a telecommunications network.

Mobile communications network operators often provide, what are referred to as PLMN specific supplementary services, to individual subscribers and their subscriber units. Provisioning of these PLMN specific supplementary services can depend on subscribers' particular service agreements with the mobile communications network operators. Examples of PLMN specific supplementary services may include, for example, Pre-Call-Announcement, operator-defined services, e.g., Operator Service 1, Operator-defined Service 2, etc.

BRIEF SUMMARY OF THE DISCLOSURE

In accordance with one embodiment, a method comprises identifying a serving network to which a subscriber unit is attached or is attaching, and comparing the identity of the serving network to an identity of a home network associated with the subscriber unit. A home network profile of the subscriber unit can be retrieved when the identity of the serving network does not match the identity of the home network. In the home network profile, PLMN specific supplementary services provisioned for the subscriber unit in the home network can be identified. The PLMN specific supplementary services provisioned for the subscriber unit in the home network can be correlated with PLMN specific supplementary service identifiers specified in the serving network. The PLMN specific supplementary service identifiers specified in the serving network that correspond to the PLMN specific supplementary services provisioned for the subscriber unit in the home network are transmitted to the serving network, enabling PLMN specific supplementary services provisioned for the subscriber unit in the home network through the serving network.

In some embodiments, the serving network comprises a visited PLMN and the home network comprises a home PLMN.

In some embodiments, identifying the serving network comprises extracting a national destination code associated with the serving network from a Mobile Application Part-Update Location message. In some embodiments, the method further comprises representing the correlation between the PLMN specific supplementary services provisioned for the subscriber unit in the home network and the PLMN specific supplementary service identifiers specified in the serving network as a mapping table. The mapping table may comprise the NDC associated with the serving network, one or more PLMN specific supplementary services codes as provisioned in the serving network, and for each of the one or more PLMN specific supplementary services codes, a corresponding PLMN specific supplementary service description. The transmission of the PLMN specific supplementary service identifiers specified in the serving network that correspond to the PLMN specific supplementary services provisioned for the subscriber unit in the home network can be performed using one of a Mobile Application Part-Insert Subscriber Data message transmitted to an MSC of the serving network or a response to a Mobile Application Part-Send Routing Information message transmitted to a gateway MSC communicatively connected to the serving network.

In some embodiments, the Mobile Application Part-Insert Subscriber Data message is transmitted in response to a Mobile Application Part-Update Location message when the subscriber unit is trying to attach to the serving network. In some embodiments, the Mobile Application Part-Insert Subscriber Data message comprises a stand-alone message in response to a serving network update.

In accordance with another embodiment, a server may include one or more processors and a memory storing instructions that, when executed by the one or more processors, cause the server to perform the following operations: identify a visited network in which a subscriber unit is receiving or attempting to receive mobile communication services; identify if the subscriber unit subscribes to at least one home PLMN specific supplementary service; map the home PLMN specific supplementary service to a corresponding visited PLMN specific supplementary service provided in the visited network; replace a home PLMN specific supplementary service code with a visited PLMN specific supplementary service code corresponding to the visited PLMN specific supplementary service in a related outgoing Mobile Application Part message; and transmit the visited PLMN specific supplementary service code to the serving network, enabling the visited PLMN specific supplementary service provided in the visited network to the subscriber unit.

In some embodiments, the at least one home PLMN specific supplementary service comprises a public land mobile network specific supplementary service. In some embodiments, the server maps the home PLMN specific supplementary service to the visited PLMN specific supplementary service code based upon a national destination code associated with the visited network.

In some embodiments, the server comprises a home location register, and the server transmits the visited PLMN specific supplementary service code to one of a mobile switching center, a gateway mobile switching center, or a visited location register of the visited network.

In some embodiments, the server transmits the visited PLMN specific supplementary service code in a Mobile Application Part-Insert Subscriber Data message. The server may transmit the Mobile Application Part-Insert Subscriber Data message in response to a Mobile Application Part-Location Update message during a subscriber unit attachment process with the visited network. The server may transmit the Mobile Application Part-Insert Subscriber Data message in response to a visited network update regarding the visited PLMN specific supplementary service.

In some embodiments, the server transmits the visited PLMN specific supplementary service code in a Mobile Application Part-Send Routing Information acknowledge message.

Other features and aspects of the present disclosure will become apparent from the following detailed description, taken in conjunction with the accompanying drawings, which illustrate, by way of example, the features in accordance with various embodiments. The summary is not intended to limit the scope of the present disclosure, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only, and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

Figure 1:
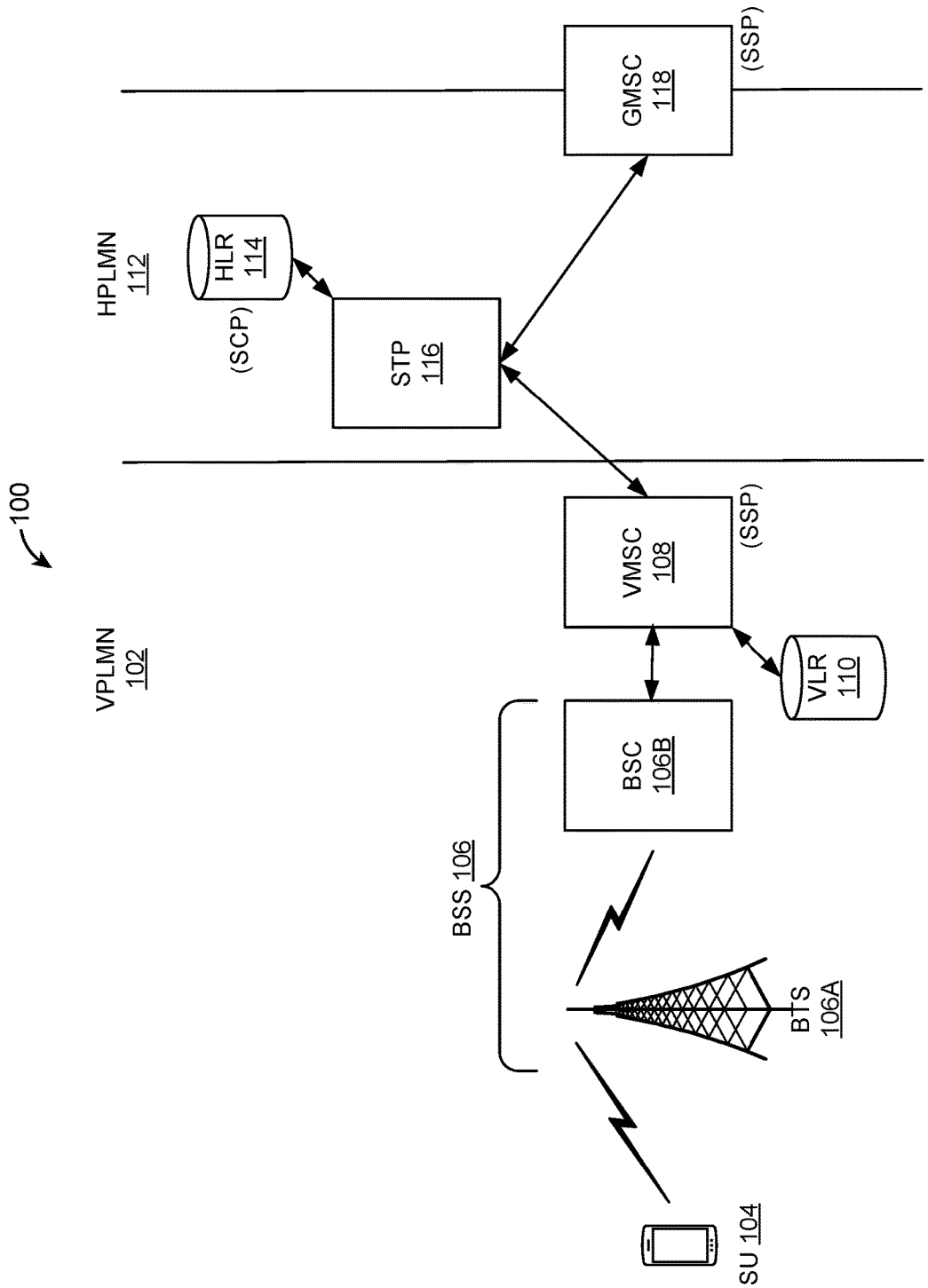
FIG. 1 is a schematic block diagram illustrating an example communications network in which the technology described herein may be implemented.

The figures are not intended to be exhaustive or to limit various embodiments to the precise form disclosed. It should be understood that various embodiments can be practiced with modification and alteration.

DETAILED DESCRIPTION

As noted above, mobile communications network operators often provide PLMN specific supplementary services to individual subscribers. PLMN specific supplementary services may be assigned or defined using a PLMN specific supplementary service code with which a particular PLMN specific supplementary service may be invoked. The use of PLMN specific supplementary service codes allows subscriber units to be queried and allows certain service parameters to be set directly from subscriber units. Although PLMN specific supplementary service codes are based on standardized values, i.e., defined in the 3GPP 29.002 Mobile Application Part (MAP) standard, the meaning of a particular value is left up to the mobile communications network operator to define and implement. The result is that the meaning of a particular PLMN specific supplementary service code (i.e., the PLMN specific supplementary service corresponding to a PLMN specific supplementary service code) can vary from one mobile communications network operator to another. For example, one mobile communications network operator may use a code "248" to refer to a "Pre-Call-Announcement" PLMN specific supplemental service, while another mobile communications network operator may assign the code "241" to the same "Pre-Call Announcement" PLMN specific supplemental service.

As another example, one mobile communications network operator may define and/or implement a particular PLMN specific supplemental service that another mobile communications network operation may not. In this way, mobile communications network operators can differentiate themselves based on their particular PLMN specific supplementary service offerings. Moreover, mobile communications network operators may allow subscribers to manage and/or modify their PLMN specific supplementary services directly, using their subscriber units (or other computing devices), potentially leading to further differences in the definition and implementation of PLMN specific supplementary services. Further still, the same mobile communications network operator may opt to provide different PLMN specific supplemental services within different geographical locations or coverage areas (zones, circles, etc.) of the same mobile communications network. For example, a subscriber unit that subscribes to some set of PLMN specific supplementary services provided by a mobile communications network operator may not receive the same set of PLMN specific supplementary services across the entire service area of the mobile communications network operator.

In short, discrepancies regarding the definition and/or implementation of PLMN specific supplementary services may exist between different mobile communications network operators and/or regions of a mobile communications network. Thus, mobile communications network operators are unable to provide consistent access to PLMN specific supplementary services across different mobile communications networks or service regions.

In accordance with various embodiments, a PLMN specific supplementary service provided in a first mobile communications network or region of the first mobile communications network can be mapped to a PLMN specific supplementary service code used in a second mobile communications network or region thereof. The first mobile communications network may be referred to as a home mobile communications network, also referred to as a home PLMN (HPLMN). The second mobile communications network may be referred to as a visited mobile communications network or visited PLMN (VPLMN). This mapping can be accomplished based on a mobile communications network identifier, e.g., an associated National Destination Code (NDC). Conventional signaling, such as Mobile Application Part (MAP) signaling may be used to exchange information regarding PLMN specific supplementary services between one or more elements making up a mobile communications network.

For example, a table, matrix, or other listing correlating PLMN specific supplementary services provided in a first mobile communications network or region (HPLMN) to PLMN specific supplementary service codes used in a second mobile communications network or region of the first mobile communications network (VPLMN) may be created. When a subscriber unit is roaming in the VPLMN, the HLR of the HPLMN to which the subscriber unit is subscribed can access the aforementioned table and identify VPLMN specific supplementary service codes corresponding to HPLMN specific supplementary services. The HLR may replace its HPLMN specific supplementary services codes with that of the VPLMN. In this way, the subscriber unit can receive the same PLMN specific supplementary services to which it subscribes in its HPLMN while roaming in the VPLMN.

It should be noted that although some embodiments disclosed herein are described in the context of PLMN specific supplementary services, various embodiments can be adapted for use in the context of other services, characteristics, or parameters associated with a subscriber or subscriber unit (SU) operating in a foreign or visited mobile communications network.

Before describing various embodiments in detail, it is instructive to describe an example communications network in which PLMN specific supplementary services can be implemented and provided to SUs. FIG. 1 illustrates an example communications network 100 in which an SU 104 has roamed into VPLMN 102. It should be noted that SU 104 may be in the process of or attempting to attach to VPLMN 102 or SU 104 may already be attached and receiving service in VPLMN 102. SU 104 may be a registered SU of HPLMN 112.

As alluded to above, communications networks (e.g., communications network 100) generally use SS7 signaling to set up and tear down calls. Because both fixed and mobile communications networks may use SS7 signaling, different physical entities may be used in the exchange of SS7 signaling (depending on the particular type of network through which communications are being effectuated). In communications network 100, SU 104 may communicate through a base station subsystem (BSS) 106. BSS 106 may include a base transceiver station (BTS) 106A and base station controller (BSC) 106B. BSS 106 can be responsible for handling traffic and signaling between SU 104 and the switching subsystem of communications network 100. BSS 106 may handle speech transcoding, radio channel allocation, paging, and other functions.

BTS 106A can include transceiver and antenna hardware, as well as equipment for encrypting/decrypting communications with BSC 106B. That is, BTS 106A can receive radio signals from subscriber units, such as SU 104, and convert or transcode these radio signals into a form that can be sent to a wired section of communications network 100. BSC 106B controls BTS 106A, handles the channel allocation mentioned above, controls handovers between BTSs, and receives operational measurements of subscriber units, e.g., SU 104, etc. It should be noted that although communications network 100 illustrates a single BTS 106A being operatively connected to BSC 106B, BSC 106B is capable of controlling tens or hundreds of BTSs. BSC 106B can relay information between one or more BTSs, e.g., BTS 106A, in a particular region or area, and a corresponding mobile switching center (in this case, visited MSC (VMSC) 108.

MSCs generally cover an area having multiple BSCs which, as noted above, control one or more BTSs. An MSC maintains the status of a subscriber/SU. In this case, VMSC 108 maintains the status of SU 104 as it roams in VPLMN 102 by storing SU 104's information in VLR 110. For example, when a subscriber turns on his/her SU, e.g., SU 104, VMSC 108 will receive a signal from BSC 106B that SU 104 wishes to attach to VPLMN 102. The VMSC 108 queries HLR 114 of HPLMN 112 to see if SU 104 is allowed to join VPLMN 102. That is, VMSC 108 sends a message over the SS7 network to query HLR 114 to see if SU 104 is allowed to roam to different networks, in this case, VPLMN 102. If SU 104 is allowed to join VPLMN 102, VMSC 108 will copy a portion of SU 104's details to the VLR associated with VMSC 108, i.e., VLR 110. If an SU is calling a fixed communication/landline network or a communications network other than the one to which the SU is connected, an MSC queries the SS7 network to determine where to route the call to, and to then route the call to the public switched telephone network (PSTN). In communications network 100, gateway MSC (GMSC) 118 may comprise a particular type or kind of MSC adapted to route calls outside a mobile network, e.g., the PSTN. In some embodiments, a GMSC, e.g., GMSC 118, may be adapted to determine at which VMSC a called SU is located.

As illustrated in FIG. 1, VMSC 108 is one embodiment of a service switching point (SSP), as is GMSC 118, while HLR 114 may be one embodiment of a service control point (SCP). SSPs refer to telephony switches, in this case, MSCs, which are connected to each other by SS7 links. SSPs communicate based on addresses of those SSPs. SSPs handle both the signaling and content of voice calls. For example, when a new voice call comes into an SSP, e.g., VMSC 108, the SSP sends messages over the SS7 network to an SCP, in this case, HLR 114, find out how to correctly route the call.

An SCP acts as a gateway between the public SS7 network and a communications network operator's internal databases. For example, an SCP, in this case, HLR 114, accepts queries from an SSP, e.g., VMSC 108, and checks the details stored therein. When the SCP has found the relevant information requested by the SSP, the SCP sends the relevant information back to the SSP over the SS7 network.

STPs, e.g., STP 116, operate as routers to route messages through and among the SS7 network. When an SSP/SCP sends a message over the SS7 network, the message is routed through STPs. It should be understood that STPs do not generally originate messages themselves, but rather route SS7 messages throughout the SS7 network.

An HLR, e.g., HLR 114, can refer to a database server that mobile communications network operators use to maintain each subscriber's international mobile subscriber identity (IMSI). A subscriber's service profile (including PLMN specific supplementary services provisioned for the subscriber), activity status and security details may also be stored in an HLR. As described above, when an SU, e.g., SU 104, tries to roam to a foreign network (or country), e.g., VPLMN 102, VPLMN 102 vis-à-vis VMSC 108 queries the HLR of the subscriber's home network, e.g., HLR 114, to see if the SU is allowed to roam. When an SU, e.g., SU 104, moves from one service area, such as HPLMN 112, to another service area or roams to a new network, such as VPLMN 102, HLR 114 will receive notice from VLR 110 that SU 104 has moved into its range. HLR 114 will notify a previously-utilized VLR to drop details of SU 104. In this way, an HLR can respond to a query with the relevant VLR and MSC currently serving an SU.

An SU, such as SU 104, may become active as a result of a subscriber turning SU 104 on, at which point, SU 104 may register with a network, such as VPLMN 102. A subset of SU 104's HLR information is copied to VLR 110 by the MSC serving SU 104, in this case, VMSC 108. A VLR may hold both information associated with both a home SU and a visiting SU.

Figure 2A:
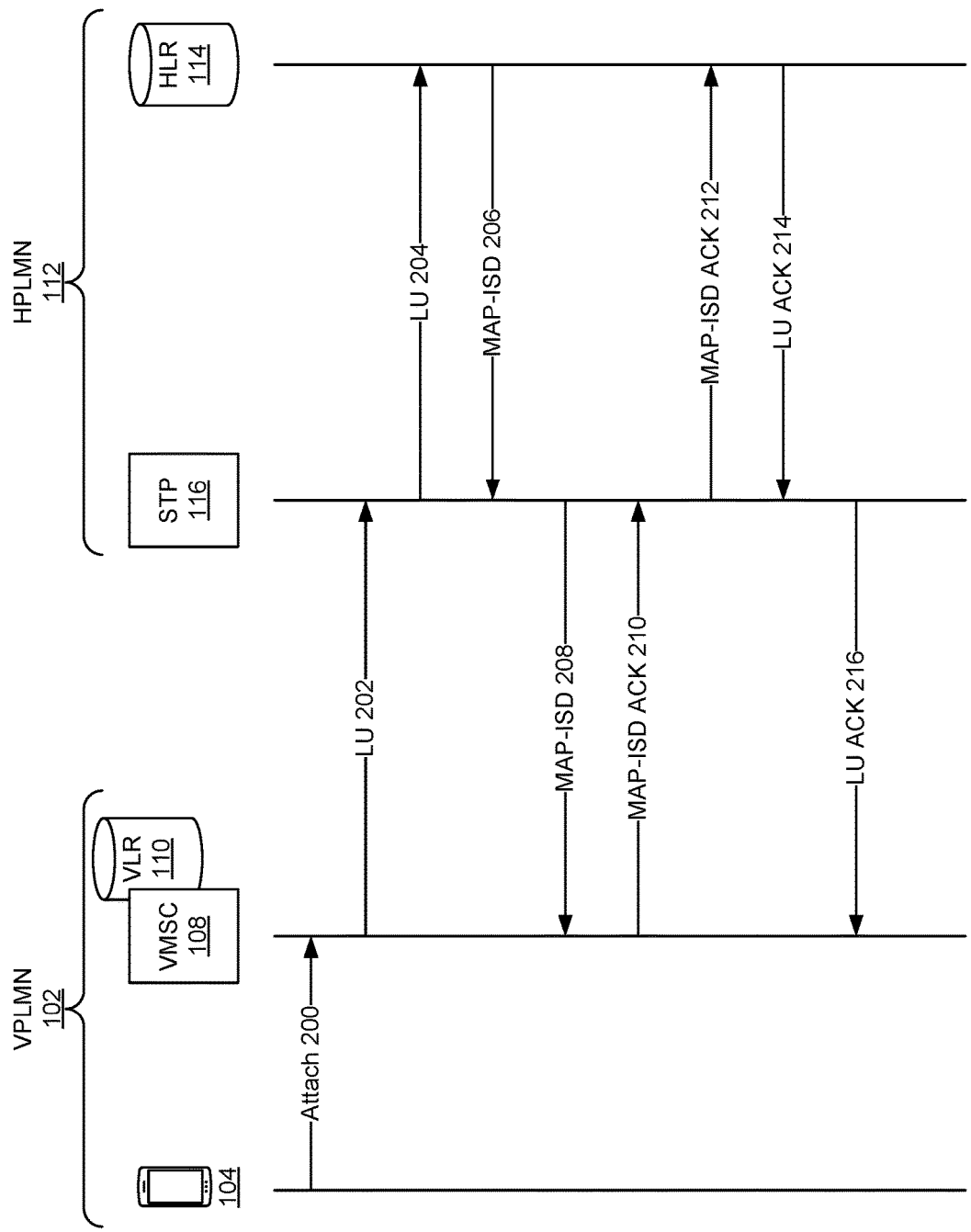
FIG. 2A is an example messaging flow scenario illustrating conventional downloading of PLMN specific supplementary service codes via Mobile Application Part-Insert Subscriber Data messages.

FIG. 2A illustrates an example SS7 signal message flow associated with conventional downloading of a subscriber profile using MAP-Insert Subscriber Data (ISD) messages. In particular, an attach message 200 is sent from SU 104 to VMSC 108. Attach message 200 is sent as part of an attach procedure that is performed so that a VMSC, e.g., VMSC 108, and its corresponding VLR (VLR 110) can register a roaming SU, such as SU 104, in the visited communications network, in this case, VPLMN 102. A location update (LU) message 202 is sent to STP 116 in VPLMN 102. The LU message 202 may include, e.g., IMSI information associated with SU 104, among other information. STP 116 forwards the LU message (forwarded LU message 204) to HLR 114 in HPLMN 112. Subscription data associated with SU 104 is sent back to STP 116 in a MAP-ISD message 206. Subscription data can include Mobile Station Integrated Services Digital Network (MSISDN) (telephone number) data, profile data, etc. associated with SU 104. In some embodiments, profile data can include PLMN specific supplementary service codes associated with PLMN specific supplementary services provisioned for a subscriber unit, e.g., SU 104, in HPLMN 112.

The subscription data is forwarded to VMSC 108 (forwarded MAP-ISD message 208). It should be understood that the subscription data is ultimately transferred to VLR 110 upon being received at VMSC 108. VMSC 108 may transmit a MAP-ISD Acknowledge (ACK) message 210 back to STP 116. This MAP-ISD-ACK message is forwarded (as forwarded MAP-ISD-ACK message 212) to HLR 114. HLR 114 may respond by sending a LU ACK message 214 to STP 116, which transmits forwarded LU ACK message 216 to VMSC 108.

In this way, PLMN specific supplementary service codes representative of PLMN specific supplementary services provided to SU 104 in HPLMN 112 can be used to invoke/provide those PLMN specific supplementary services while SU 104 is roaming in VPLMN 102. However, as noted above, it is often the case that PLMN specific supplementary service codes provided in one PLMN or service region are not the same as those used in another PLMN or service region. Accordingly, if a PLMN specific supplementary service code corresponding to a particular PLMN specific supplementary service provisioned in HPLMN 112 was downloaded from HLR 114, use of that downloaded PLMN specific supplementary service code in VPLMN 102 may invoke a different PLMN specific supplementary service. For example, a downloaded HPLMN specific supplementary service code that refers to a particular PLMN specific supplementary service, e.g., "operator specific service 1" in HPLMN 112 may be designated with code "242." However, "242" can refer to a different service in VPLMN 102, such as a particular callback ringtone PLMN specific supplementary service. In this example, use of PLMN specific supplementary service code "242" by SU 104 as it is roaming in VPLMN 102 will result in an incorrect or undesired PLMN specific supplementary service being invoked.

It should be noted that in cases where a PLMN specific supplementary service code status for a given SU is disabled, and the SU is already attached to a VPLMN, the SU's HLR may trigger a MAP-Delete Subscriber Data (DSD) message to be sent to the VMSC. In this way, any data associated with PLMN specific supplementary services is removed from the VLR.

Figure 2B:
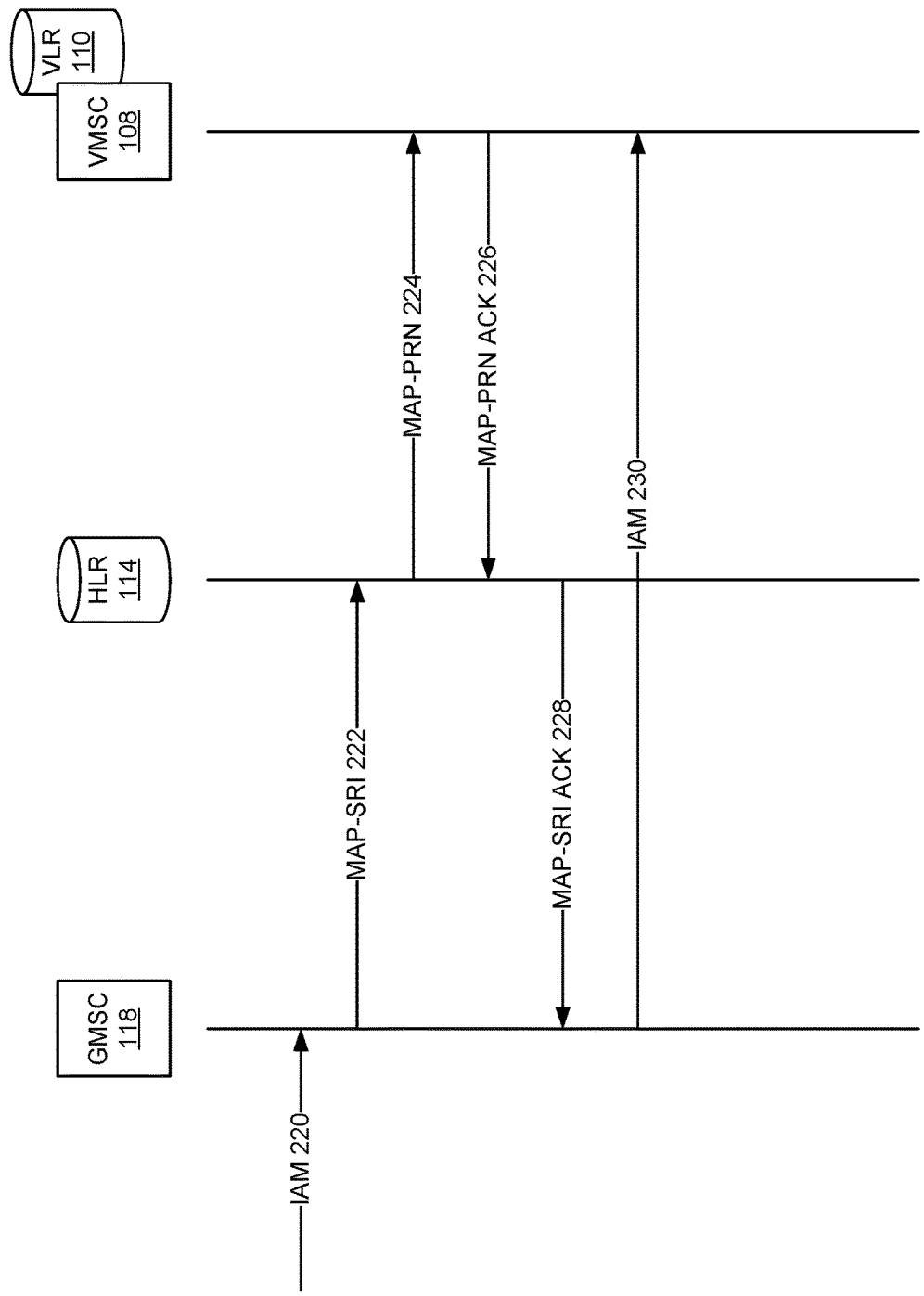
FIG. 2B is an example messaging flow scenario illustrating conventional downloading of PLMN specific supplementary service codes via Mobile Application Part-Send Routing Information messages.

In some cases, PLMN specific supplementary service codes may be downloaded from an HLR whenever a GMSC requests SU data. This can be accomplished using MAP-Send Routing Information (SRI) messages. FIG. 2B illustrates an example SS7 signal message flow associated with conventional downloading of PLMN specific supplementary service codes using MAP-SRI messages. An Initial Address Message (IAM) 220 may be received by GMSC 118. An IAM message may be constructed by VMSC 108 using the MSISDN of SU 104 as a result of a SU 104's MSISDN being dialed by another subscriber unit. It should be understood that an SU's MSISDN may comprise a national destination code (NDC) and a country code. Based on the MSISDN, GMSC 118 identifies SU 104's HLR, in this case, HLR 114, and transmits a MAP-SRI message 222 (which includes the MSISDN of SU 104) to HLR 114. GMSC 118 transmits MAP-SRI message 222 to determine a current location of SU 104.

HLR 114 can extract the NDC (for purposes of determining appropriate PLMN specific supplementary services) from the address of GMSC 118. HLR 114 (based on, e.g., past location updates) may be aware that SU 104 is being served by VMSC 108/VLR 110. Accordingly, HLR 114 queries VLR 110 by transmitting a MAP-Provide Roaming Number (PRN) message 224 with SU 104's IMSI as a parameter. VLR 110 assigns a Mobile Subscriber Roaming Number (MSRN) from a pool of available numbers and sends the MSRN back to HLR 114 in a MAP-PRN ACK message 226. HLR 114 may transmit a MAP-SRI ACK message 228 to GMSC 118 giving GMSC 118 the knowledge as to SU 104's location and serving MSC, i.e., VMSC 108. Moreover, PLMN specific supplementary service codes may be included in MAP-SRI ACK message 228. Because GMSC 118 is aware of the MSC, i.e., VMSC 108, currently serving SU 104, GMSC 118 generates an IAM 230 with the MSRN as a called party number. When VMSC 108 receives the IAM 230, it recognizes the MSRN and knows the IMSI for which the MSRN was allocated. Moreover, GMSC 118 can be made aware of the PLMN specific supplementary services to which SU 104 subscribes.

As alluded to above, VPLMN specific supplementary service codes can be mapped to HPLMN specific supplementary services. In some embodiments, this mapping may be generated based on knowledge of the PLMN specific supplementary services configured in each communications network. Mobile communications network operators are generally aware of what PLMN specific supplementary services are configured in different PLMNs. Information regarding the configured PLMN specific supplementary services and their corresponding PLMN specific supplementary service codes may be stored in an HLR/VLR. Accordingly, a mapping between VPLMN specific supplementary service codes and HPLMN specific supplementary services may be created using information contained in the relevant HLR/VLR. Matching HPLMN and VPLMN specific supplementary services may be identified, and the corresponding VPLMN supplementary service codes may be mapped to the matching HPLMN specific supplementary services.

Figure 3:
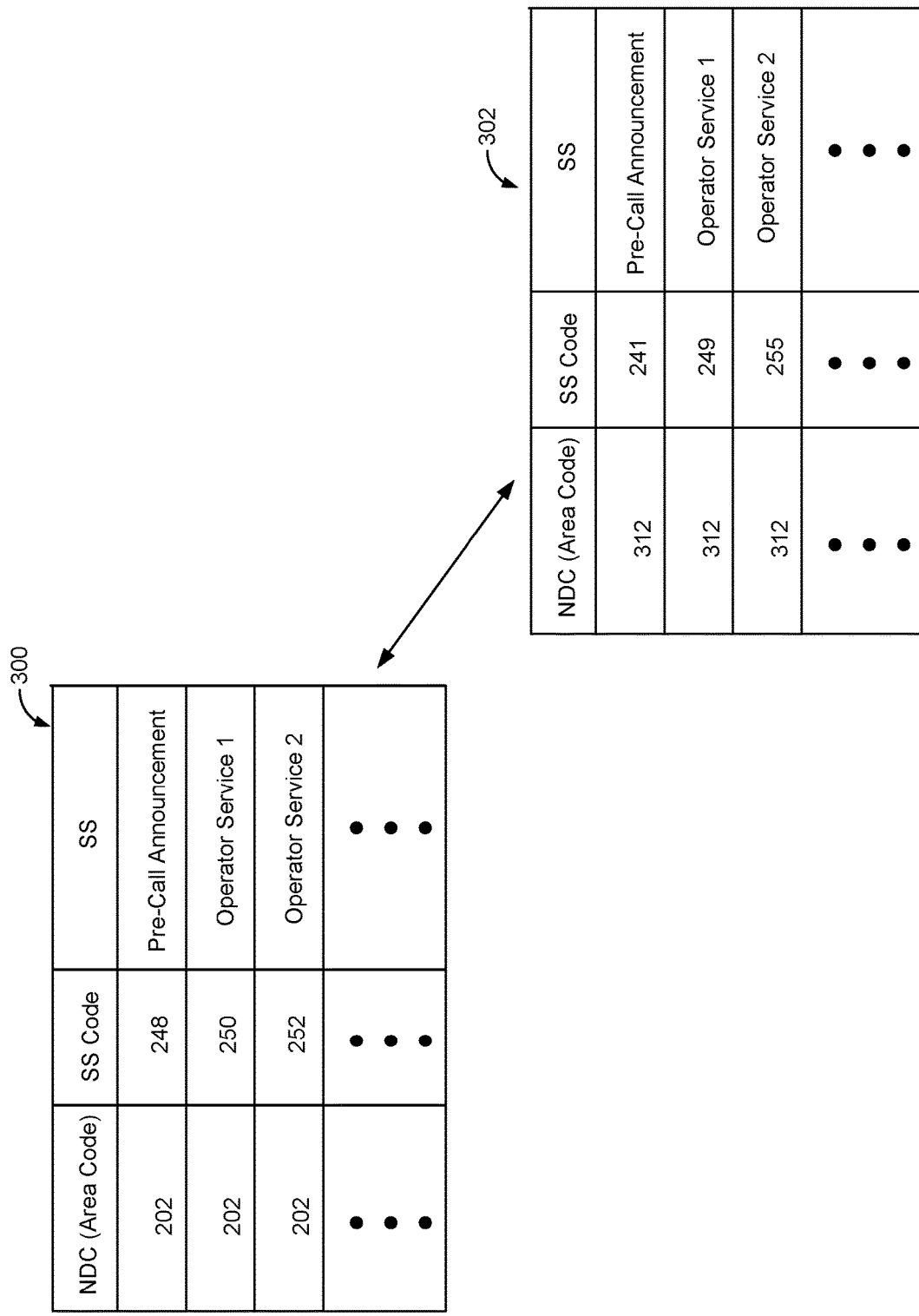
FIG. 3 illustrates an example PLMN specific supplementary service code mapping.

FIG. 3 illustrates an example HPLMN specific supplementary services table 300. Table 300 sets forth certain HPLMN specific supplementary services, such as "Pre-Call Announcement" (associated with code 248), "Operator Service 1" (associated with code 250), and "Operator Service 2" (associated with code 252). As also set forth in table 300, an NDC identifying the HPLMN, in this case, area code "202" may be associated with each of the HPLMN supplementary services. FIG. 3 further illustrates a mapping table 302 reflecting an example correlation between VPLMN specific supplementary service codes to the HPLMN specific supplementary services set forth in table 300. In this example, the VPLMN is identified with an NDC/area code "312."

It should be noted that mapping table 302 may take various forms. In the illustrated example of FIG. 3, mapping table 302 is shown as mapping VPLMN specific supplementary service codes relevant to a particular NDC. However, in other embodiments, a mapping table may comprise VPLMN specific supplementary service codes and corresponding HPLMN specific supplementary services that span multiple NDCs.

Without mapping table 302, an HLR would merely return the HPLMN specific supplementary service code(s) to the VMSC. If the HPLMN specific supplementary service code(s) do not match those of the VMSC, the desired HPLMN specific supplementary service(s) will not be invoked. For example, a VPLMN and HPLMN may use the same PLMN specific supplementary service codes, but associate/define those codes with different PLMN specific supplementary services. An SU, expecting to be provided with HPLMN specific supplementary services will instead be provided with VPLMN specific supplementary services.

However, in accordance with various embodiments, an HLR may access mapping table 302. HLR may transmit, in a MAP-ISD message to the VMSC, for example, the VPLMN specific supplementary service code(s) corresponding to the desired HPLMN specific supplementary service(s). In this way, an SU can receive desired HPLMN specific supplementary services while roaming in the VPLMN.

Figure 4A:
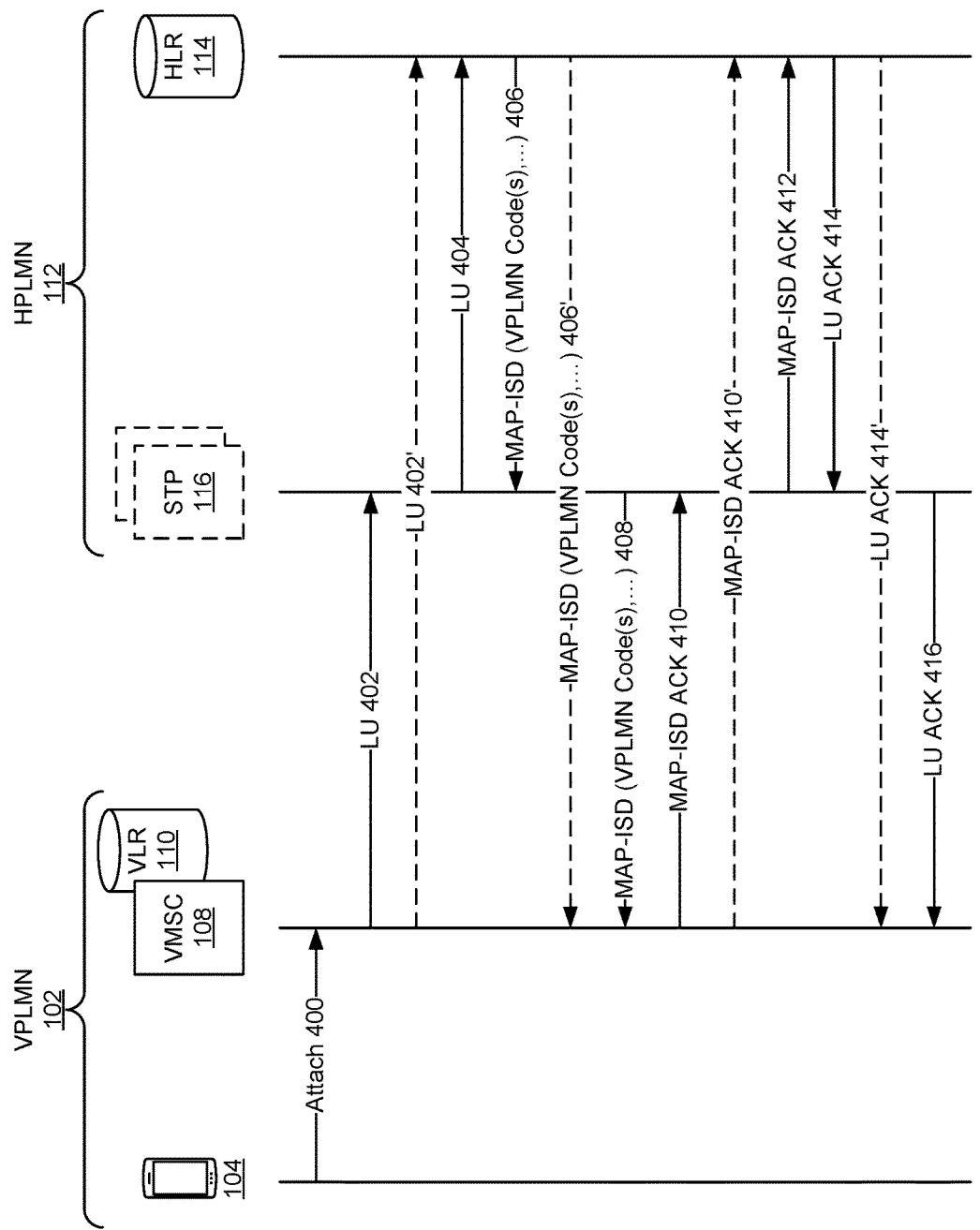
FIG. 4A is an example messaging flow scenario illustrating downloading of PLMN specific supplementary service codes in accordance with one embodiment of the technology described herein.

FIG. 4A illustrates an example SS7 signal message flow associated with providing VPLMN specific supplementary service codes that have been mapped to HPLMN specific supplementary services. Similar to the SS7 signal message flow illustrated in FIG. 2A and described above, SU 104 may be roaming in a VPLMN (e.g., VPLMN 102 of FIG. 1). Accordingly, SU 104 may transmit an attach message 400 to VMSC 108. As described above, attach message 400 may be sent as part of an attach procedure that is performed so that VMSC 108 and corresponding VLR 110 can register a roaming SU 104 in VPLMN 102. An LU message 402 may be sent to STP 116 in VPLMN 102. The LU message 402 may include, e.g., IMSI information associated with SU 104, among other information. STP 116 forwards the LU message (forwarded LU message 404) to HLR 114 in HPLMN 112. Subscription data associated with SU 104 is sent back to STP 116 in a MAP-ISD message 406. Subscription data can include Mobile Station Integrated Services Digital Network (MSISDN) (telephone number) data, profile data, etc. associated with SU 104. In some embodiments, profile data can include PLMN specific supplementary service codes associated with supplementary services provisioned for an SU, in this case, SU 104, in HPLMN 112.

In contrast to conventional scenarios in which HPLMN specific supplementary service codes are sent vis-à-vis the MAP-ISD message, mapped VPLMN specific supplementary services codes are sent to VMSC 108 in accordance with various embodiments. That is, HLR 114, upon receiving LU message 402, may extract the NDC associated with or identifying VMSC 108. HLR 114 may access a mapping table, e.g., mapping table 302 (FIG. 3), corresponding to the extracted NDC. HLR 114 may then transmit the VPLMN specific supplementary service codes defined in VMSC 108/VPLMN 102 instead of the HPLMN specific supplementary service codes defined in HPLMN 112 (to which HLR 114 belongs). In this way, the HPLMN specific supplementary services SU 104 expects to receive (as if it were in HPLMN 112) can be provided using the VPLMN specific supplementary service codes.

Similar to the SS7 signal message flow of FIG. 2A, the subscription data is forwarded to VMSC 108 (forwarded MAP-ISD message 408). It should be understood that the subscription data is ultimately transferred to VLR 110 upon being received at VMSC 108. VMSC 108 may transmit a MAP-ISD Acknowledge (ACK) message 410 back to STP 116. This MAP-ISD-ACK message is forwarded (as forwarded MAP-ISD-ACK message 412) to HLR 114. HLR 114 may respond by sending an LU ACK message 414 to STP 116, which transmits forwarded LU ACK message 416 to VMSC 108.

It should be noted that in some scenarios, depending on the particular configuration or makeup of the respective HPLMN and/or VPLMN, the above-described MAP and LU messages may be exchanged directly between HLR 114 and VMSC 108/VLR 110. That is, in some communications networks, an STP may not be present or involved. In this scenario, VMSC 108 may transmit LU message 402' directly to HLR 114. HLR 114 may respond directly by transmitting MAP-ISD message 406' (including VPLMN specific supplementary service codes) directly to VMSC 108. VMSC 108 may transmit MAP-ISD ACK message 410' directly to HLR 114. HLR 114 may respond directly to VMSC 108 with LU ACK message 414'.

Figure 4B:
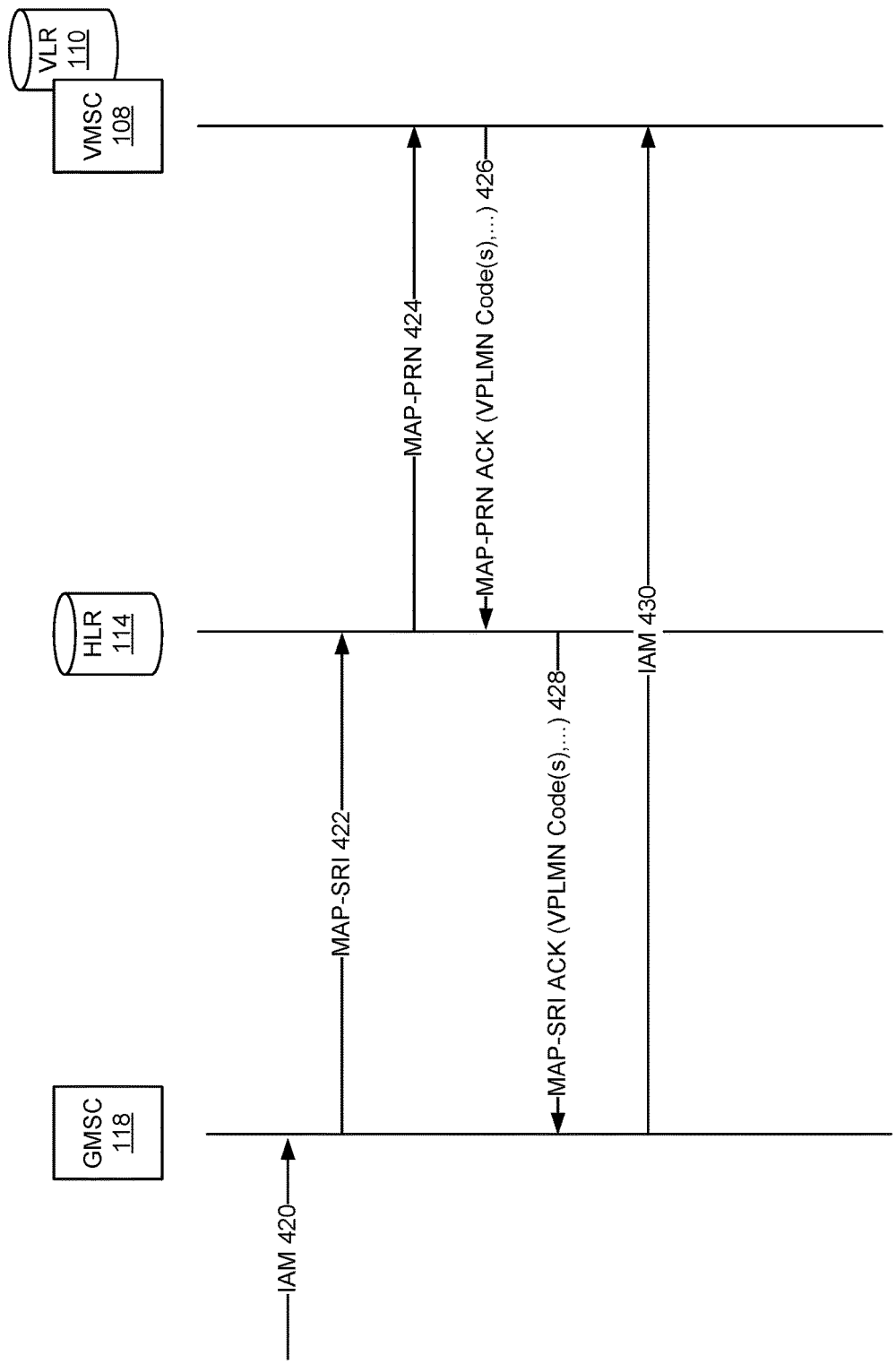
FIG. 4B is an example messaging flow scenario illustrating downloading of PLMN specific supplementary service codes in accordance with another embodiment of the technology described herein.

As noted above, PLMN specific supplementary service codes may be downloaded from an HLR whenever a GMSC requests SU data. This can be accomplished using MAP-Send Routing Information (SRI) messages. FIG. 4B illustrates an example SS7 signal message flow associated with downloading of VPLMN specific supplementary service codes using MAP-SRI messages. An IAM 420 may be received by GMSC 118. As previously noted, an IAM message may be constructed by VMSC 108 using the MSISDN of SU 104 as a result of a SU 104's MSISDN being dialed by another subscriber unit. It should be understood that an SU's MSISDN may comprise an NDC and a country code. Based on the MSISDN, GMSC 118 identifies SU 104's HLR, in this case, HLR 114, and transmits a MAP-SRI message 422 (which includes the MSISDN of SU 104) to HLR 114. GMSC 118 transmits MAP-SRI message 422 to determine a current location of SU 104.

HLR 114 can extract the NDC (for purposes of determining appropriate PLMN specific supplementary services) from the address of GMSC 118. HLR 114 (based on, e.g., past location updates) may be aware that SU 104 is being served by VMSC 108/VLR 110. Accordingly, HLR 114 queries VLR 110 by transmitting a MAP-Provide Roaming Number (PRN) message 224 with SU 104's IMSI as a parameter. VLR 110 assigns a Mobile Subscriber Roaming Number (MSRN) from a pool of available numbers and sends the MSRN back to HLR 114 in a MAP-PRN ACK message 226. HLR 114 may transmit a MAP-SRI ACK message 428 to GMSC 118 giving GMSC 118 the knowledge as to SU 104's location and serving MSC, i.e., VMSC 108.

In contrast to conventional scenarios, where HPLMN specific supplementary service codes would be included in MAP-SRI ACK message 428, HLR 114 may, based on the NDC extracted from the address of GMSC 118, access a corresponding mapping table keyed to that particular NDC. HLR 114 may include the relevant VPLMN specific supplementary service codes in MAP-SRI ACK message 428. In this way, VPLMN specific supplementary service codes may be transmitted to GMSC 118 allowing SU 104 to receive provisioned HPLMN specific supplementary services in VPLMN 102. As before, GMSC 118 may generate an IAM 430.

Figure 5:
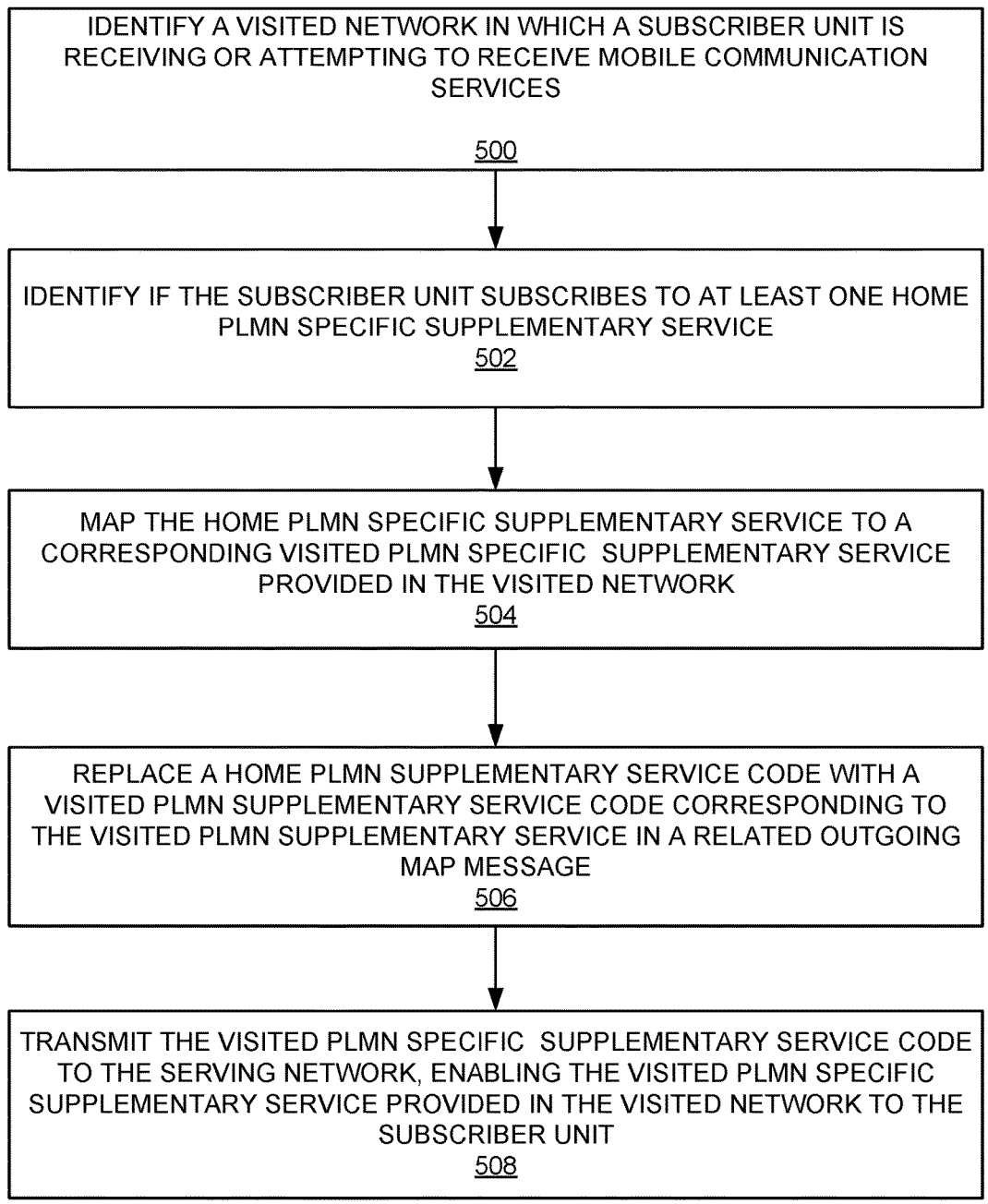
FIG. 5 is an operational flow diagram illustrating an example method that may be implemented to provide PLMN specific supplementary services in accordance with one embodiment of the technology described herein.

FIG. 5 illustrates example operations that may be performed by an HLR in order to provide VPLMN specific supplementary service codes corresponding to HPLMN specific supplementary services in accordance with one embodiment. At operation 500, a visited network in which an SU (or other mobile device) is receiving or attempting to receive mobile communication services is identified. For example, as noted above, an SU may be attached to or may be engaged in an attachment process at a VMSC serving a VPLMN in which the SU is roaming.

At operation 502, the HLR identifies if the SU subscribes to at least one HPLMN specific supplementary service. For example, the HLR may access the HPLMN profile of the SU and identify what HPLMN specific supplementary service(s), if any, are provisioned for the SU.

At operation 504, the HPLMN specific supplementary service is (or services are) mapped to a corresponding VPLMN specific supplementary service (or corresponding services in the case of more than one supplementary service). In other words, as described above, a PLMN specific supplementary service may be associated with a PLMN specific supplementary service code used to invoke or provide that PLMN specific supplementary service to an SU. Accordingly, mapping may entail correlating a VPLMN specific supplementary service code to an HPLMN specific supplementary service.

At operation 506, an HPLMN specific supplementary service code (corresponding to the HPLMN specific supplementary service) is replaced with a VPLMN specific supplementary service code. This replacement may be effectuated by the HLR accessing a mapping table (e.g., mapping table 302 of FIG. 3) and correlating the HPLMN specific supplementary service to the VPLMN specific supplementary service code. For example, the HLR may access an HPLMN specific supplementary services table provided in the HPLMN. The HLR may access the mapping table and identify VPLMN specific supplementary services matching that specified in the HPLMN specific supplementary services table. The VPLMN specific supplementary service codes associated with the identified VPLMN specific supplementary services may be used as the aforementioned replacements.

At operation 508, the VPLMN specific supplementary service code replacing the HPLMN specific supplementary service code is transmitted to the serving network, i.e., VPLMN. This enables the VPLMN specific supplementary service corresponding to a desired HPLMN specific supplementary service to be provided to the SU.

Figure 6:
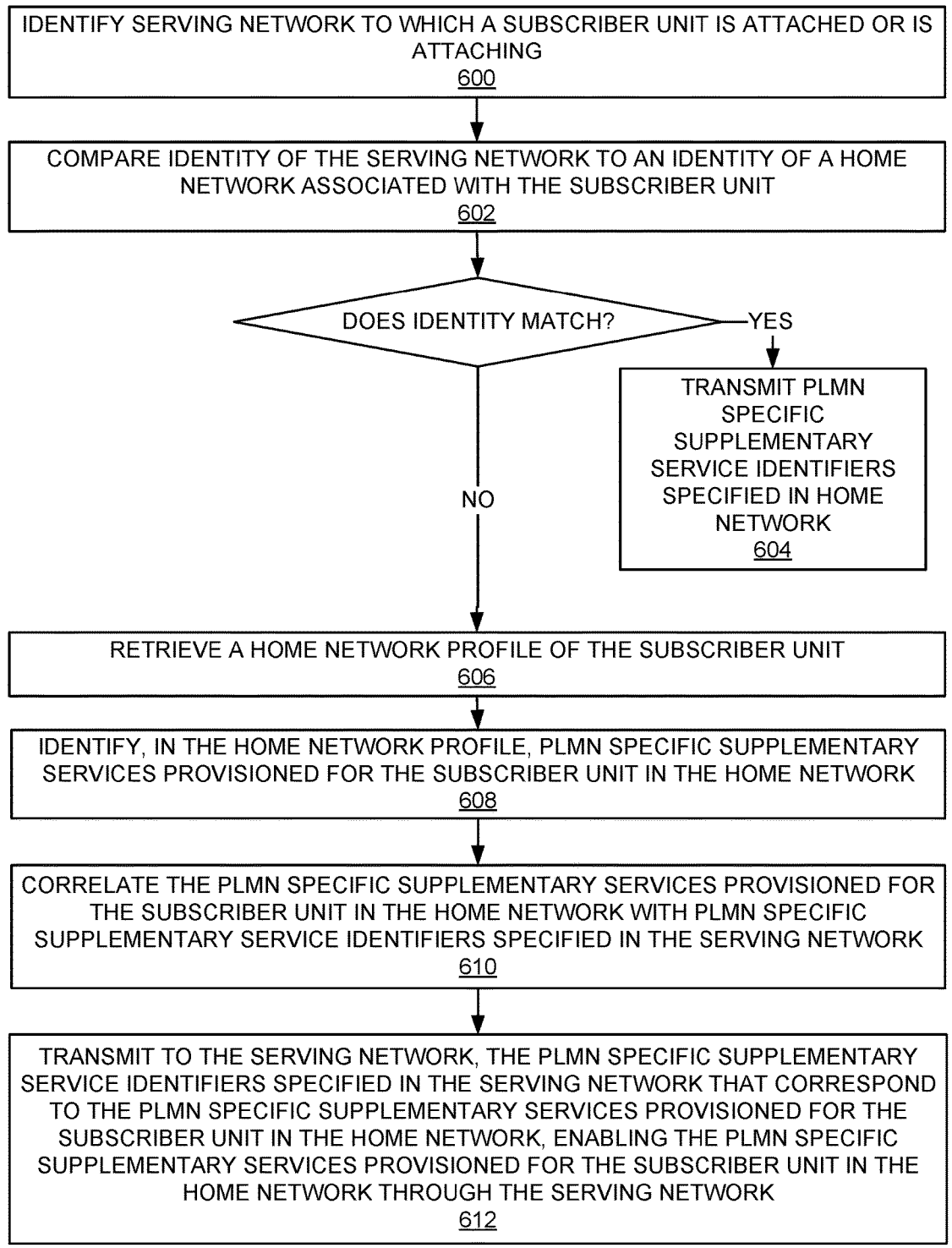
FIG. 6 is an operational flow diagram illustrating an example method that may be implemented to provide PLMN specific supplementary services in accordance with another embodiment of the technology described herein.

FIG. 6 illustrates example operations that may be performed to provide expected HPLMN specific supplementary services in a VPLMN in accordance with another embodiment. At operation 600, a serving network to which an SU is attached or attaching may be identified. As noted above, identifying a serving network may comprise extracting the NDC from an LU message received by an HLR and transmitted by an MSC to which the SU is trying to attach or is already attached.

At operation 602, the identity of the serving network is compared to that of the HPLMN associated with the SU. At operation 604, matching identities suggests that the SU is in the same HPLMN, and PLMN specific supplementary service identifiers, e.g., codes, specified in the HPLMN may be transmitted by the HLR. As described above, the transmission of PLMN specific supplementary service identifiers may be performed using a MAP-ISD message. It should be noted that in some cases, the PLMN specific supplementary service identifiers may be transmitted whenever a change to the PLMN specific supplementary service identifiers for the SU changes. That is, transmission of the PLMN specific supplementary service identifiers need not necessarily be in response to a location update.

If the identities of the serving network and home network do not match, e.g., if the SU is roaming in a VPLMN, a home network profile of the SU may be retrieved at operation 606. The HLR may extract the NDC of the VPLMN and recognize that the NDC of the VPLMN differs from that of the home network, i.e., HPLMN. At operation 608, PLMN specific supplementary services provisioned in the home network and specified in the home network profile are identified. As noted above, these PLMN specific supplementary services are associated with PLMN specific supplementary service identifiers defined in the HPLMN.

At operation 610, the PLMN specific supplementary services provisioned for the SU in the home network (HPLMN) are correlated with PLMN specific supplementary service identifiers specified in the serving network (VPLMN). For example, a mapping table may provide the correlation between PLMN specific supplementary service identifiers specified in the serving network with PLMN specific supplementary services provisioned in the home network. The correlation may be based on extracted NDC information, e.g., from an LU message received by the HLR. The HLR may replace or otherwise re-associate PLMN specific supplementary services provisioned in the home network with corresponding PLMN specific supplementary service identifiers specified in the serving network. It should be noted that this replacement or re-association occurs in outgoing MAP messaging. That is, an SU profile need not change. In cases where the home and serving networks provide the same PLMN specific supplementary services but are associated with different PLMN specific supplementary service identifiers, the PLMN specific supplementary service identifiers specified in the serving network may be used to effectuate those same PLMN specific supplementary services.

At operation 612, the PLMN specific supplementary service identifiers corresponding to the PLMN specific supplementary services of the serving network are transmitted, enabling the PLMN specific supplementary services provisioned for the SU in the home network in the serving network. It should be noted that in the case of a GMSC requesting routing information for a particular SU, the PLMN specific supplementary service identifiers may be transmitted in a response or acknowledgement to a routing information inquiry sent by the GMSC to the HLR.

The above-described embodiments can provide PLMN specific supplementary services across different networks and/or different service regions within a network. Moreover, the above-described embodiments can reduce network complexity by eliminating the need to manually update MSCs in order to adapt to PLMN specific supplementary services that may be supported differently. Communications network operators can be afforded greater flexibility as well by way of the disclosed systems and methods of adapting to PLMN specific supplementary services that may be specified in different ways. Further still, a subscriber's communications experience can be improved by seamlessly supporting PLMN specific supplementary services regardless of where the subscriber unit is located/which PLMN is providing service.

Figure 7:
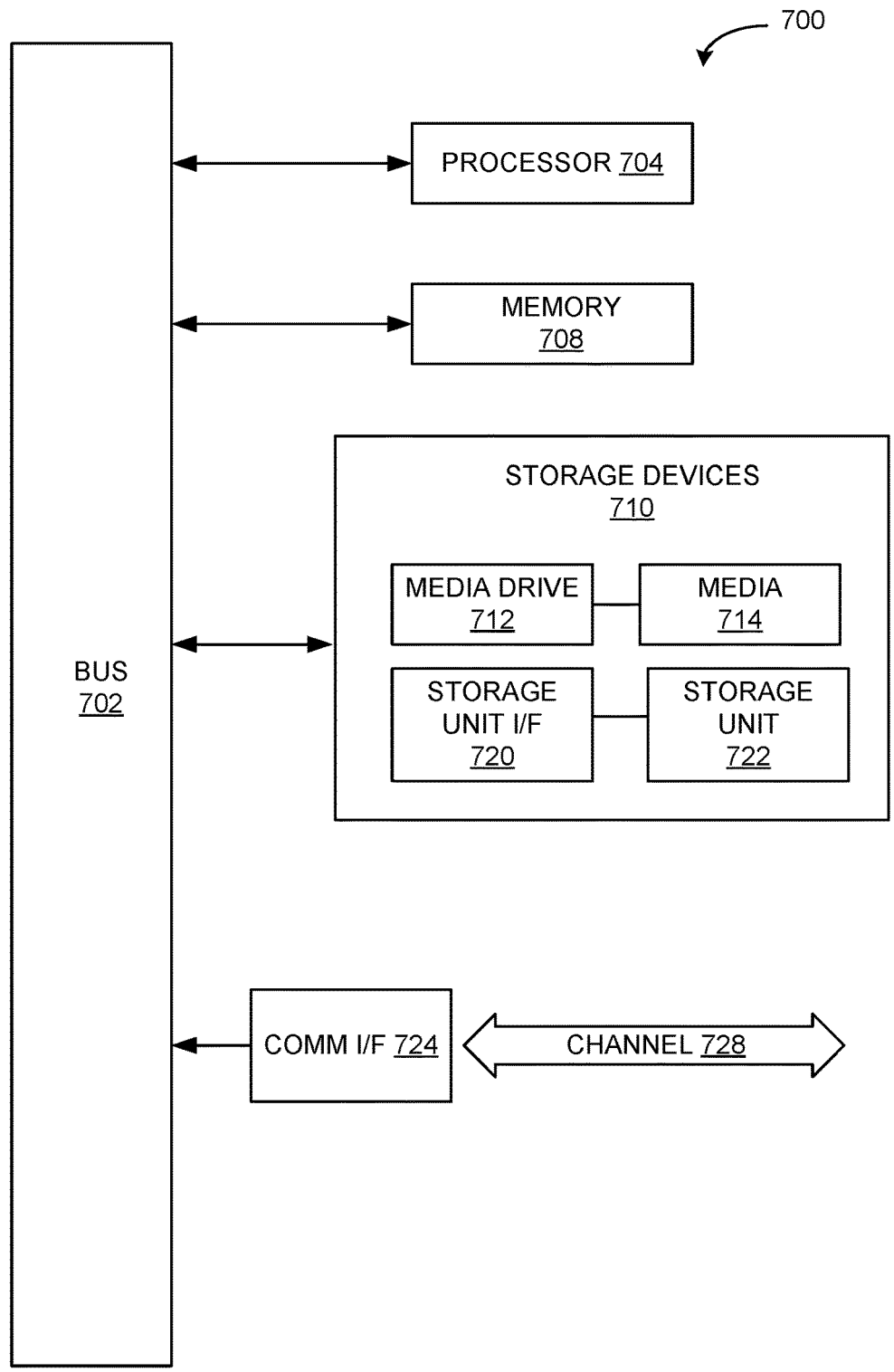
FIG. 7 is an example of a computing component that can be used in conjunction with various embodiments of the present disclosure.

FIG. 7 illustrates an example computing component that may be used to implement various features of the methods disclosed herein.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations.

Where components of the application are implemented in whole or in part using software, in one embodiment, these software elements can be implemented to operate with a computing or processing component capable of carrying out the functionality described with respect thereto. One such example computing component is shown in FIG. 7. Various embodiments are described in terms of this example computing component 700. After reading this description, it will become apparent to a person skilled in the relevant art how to implement the application using other computing components or architectures.

Referring now to FIG. 7, computing component 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 700 might include, for example, one or more processors, controllers, control components, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing component 700 or to communicate externally.

Computing component 700 might also include one or more memory components, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, an optical disk drive, a CD, DVD, or BLU-RAY drive (R or RW), or other removable or fixed media drive might be provided. Accordingly, storage media 714 might include, for example, a hard disk, a solid state drive, cartridge, optical disk, a CD, a DVD, a BLU-RAY, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot, a PCMCIA slot and card, and other fixed or removable storage units 722 and interfaces 720 that allow software and data to be transferred from the storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 708, storage unit 722, and media 714. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the elements or functionality described or claimed as part of the component are all configured in a common package. Indeed, any or all of the various components of a component, whether control logic or other components, can be combined in a single package or separately maintained and can further be distributed in multiple groupings or packages or across multiple locations.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method; comprising:
    identifying a serving network to which a subscriber unit is attached or is attaching;
    comparing the identity of the serving network to an identity of a home network associated with the subscriber unit;
    retrieving a home network profile of the subscriber unit when the identity of the serving network does not match the identity of the home network;
    identifying, in the home network profile, public land mobile network (PLMN) specific supplementary services provisioned for the subscriber unit in the home network;
    correlating the PLMN specific supplementary services provisioned for the subscriber unit in the home network with PLMN specific supplementary service identifiers specified in the serving network;
    transmitting to the serving network, the PLMN specific supplementary service identifiers specified in the serving network that correspond to the PLMN specific supplementary services provisioned for the subscriber unit in the home network, enabling PLMN specific supplementary services provisioned for the subscriber unit in the home network through the serving network.

2. The method of claim 1, wherein the serving network comprises a visited PLMN and the home network comprises a home PLMN.

3. The method of claim 1, wherein identifying the serving network comprises extracting a national destination code (NDC) associated with the serving network from a Mobile Application Part (MAP)-Update Location (LU) message.

4. The method of claim 3, further comprising representing the correlation between the PLMN specific supplementary services provisioned for the subscriber unit in the home network and the PLMN specific supplementary service identifiers specified in the serving network as a mapping table comprising the NDC associated with the serving network, one or more PLMN specific supplementary services codes as provisioned in the serving network, and for each of the one or more PLMN specific supplementary services codes, a corresponding PLMN specific supplementary service description.

5. The method of claim 4, wherein the transmission of the PLMN specific supplementary service identifiers specified in the serving network that correspond to the PLMN specific supplementary services provisioned for the subscriber unit in the home network is performed using one of a MAP-Insert Subscriber Data (ISD) message transmitted to a Mobile Switching Center (MSC) of the serving network or a response to a MAP-Send Routing Information (SRI) message transmitted to a gateway MSC communicatively connected to the serving network.

6. The method of claim 5, wherein the MAP-ISD message is transmitted in response to a MAP-LU message when the subscriber unit is trying to attach to the serving network.

7. The method of claim 5, wherein the MAP-ISD message comprises a stand-alone message in response to a serving network update.

8. A system, comprising:
a server including one or more processors and a memory storing instructions that, when executed by the one or more processors, cause the server to:
identify a visited network in which a subscriber unit is receiving or attempting to receive mobile communication services;
identify if the subscriber unit subscribes to at least one home public land mobile network (PLMN) specific supplementary service;
map the home PLMN specific supplementary service to a corresponding visited PLMN specific supplementary service provided in the visited network;
replace a home PLMN specific supplementary service code with a visited PLMN specific supplementary service code corresponding to the visited PLMN specific supplementary service in a related outgoing Mobile Application Part (MAP) message; and
transmit the visited PLMN specific supplementary service code to the serving network, enabling the visited PLMN specific supplementary service provided in the visited network to the subscriber unit.

9. The system of claim 8, wherein the at least one home PLMN specific supplementary service comprises a PLMN specific supplementary service.

10. The system of claim 8, wherein the server maps the home PLMN specific supplementary service to the visited PLMN specific supplementary service code based upon a national destination code associated with the visited network.

11. The system of claim 8, wherein the server comprises a home location register, and wherein the server transmits the visited PLMN specific supplementary service code to one of a mobile switching center, a gateway mobile switching center, or a visited location register of the visited network.

12. The system of claim 11, wherein the server transmits the visited PLMN specific supplementary service code in a MAP-Insert Subscriber Data (ISD) message.

13. The system of claim 12, wherein the server transmits the MAP-ISD message in response to a MAP-Location Update (LU) message during a subscriber unit attachment process with the visited network.

14. The system of claim 12, wherein the server transmits the MAP-ISD message in response to a visited network update regarding the visited PLMN specific supplementary service.

15. The system of claim 11, wherein the server transmits the visited PLMN specific supplementary service code in a MAP-Send Routing Information (SRI) acknowledge message.

16. A non-transitory computer-readable storage medium comprising executable instructions that, when executed by a processor, causes the processor to:
identify a serving network to which a subscriber unit is attached or is attaching;
compare the identity of the serving network to an identity of a home network associated with the subscriber unit;
retrieve a home network profile of the subscriber unit when the identity of the serving network does not match the identity of the home network;
identify, in the home network profile, public land mobile network (PLMN) specific supplementary services provisioned for the subscriber unit in the home network;
correlate the PLMN specific supplementary services provisioned for the subscriber unit in the home network with PLMN specific supplementary service identifiers specified in the serving network; and
transmit to the serving network, the PLMN specific supplementary service identifiers specified in the serving network that correspond to the PLMN specific supplementary services provisioned for the subscriber unit in the home network, enabling PLMN specific supplementary services provisioned for the subscriber unit in the home network through the serving network.

17. The non-transitory computer-readable storage medium of claim 16, comprising executable instructions that, when executed by the processor, causes the processor to:
identify the serving network by extracting a national destination code (NDC) associated with the serving network from a Mobile Application Part (MAP)-Update Location (LU) message.

18. The non-transitory computer-readable storage medium of claim 17, comprising executable instructions that, when executed by the processor, causes the processor to:
represent the correlation between the PLMN specific supplementary services provisioned for the subscriber unit in the home network and the PLMN specific supplementary service identifiers specified in the serving network as a mapping table comprising the NDC associated with the serving network, one or more PLMN specific supplementary services codes as provisioned in the serving network, and for each of the one or more PLMN specific supplementary services codes, a corresponding PLMN specific supplementary service description.

19. The non-transitory computer-readable storage medium of claim 18, comprising executable instructions that, when executed by the processor, causes the processor to:
transmit the PLMN specific supplementary service identifiers specified in the serving network that correspond to the PLMN specific supplementary services provisioned for the subscriber unit in the home network using one of a MAP-Insert Subscriber Data (ISD) message transmitted to a Mobile Switching Center (MSC) of the serving network or a response to a MAP-Send Routing Information (SRI) message transmitted to a gateway MSC communicatively connected to the serving network.

20. The non-transitory computer-readable storage medium of claim 19, comprising executable instructions that, when executed by the processor, causes the processor to:
transmit the MAP-ISD message in response to a MAP-LU message when the subscriber unit is trying to attach to the serving network; or
transmit the MAP-ISD message as a stand-alone message in response to a serving network update.

* * * * *